W. H. BAKER.
DAM AND HYDRAULIC POWER CONVERTER.
APPLICATION FILED OCT. 11, 1912.

1,115,376.

Patented Oct. 27, 1914.
2 SHEETS—SHEET 1.

WITNESSES:
H. W. Meade
S. W. Atherton

INVENTOR
William H. Baker
BY
ATTORNEY

W. H. BAKER.
DAM AND HYDRAULIC POWER CONVERTER.
APPLICATION FILED OCT. 11, 1912.

1,115,376.

Patented Oct. 27, 1914.
2 SHEETS—SHEET 2.

WITNESSES:
H. W. Meade
S. W. Atherton

INVENTOR
William H. Baker
BY
A. M. Wooster
ATTORNEY

UNITED STATES PATENT OFFICE.

WILLIAM H. BAKER, OF BRIDGEPORT, CONNECTICUT.

DAM AND HYDRAULIC-POWER CONVERTER.

1,115,376.   Specification of Letters Patent.   Patented Oct. 27, 1914.

Application filed October 11, 1912. Serial No. 725,218.

*To all whom it may concern:*

Be it known that I, WILLIAM H. BAKER, a citizen of the United States, residing at Bridgeport, county of Fairfield, State of Connecticut, have invented an Improved Dam and Hydraulic-Power Converter, of which the following is a specification.

This invention has for its object to provide improved means for utilizing the dynamic energy of water falling over a precipice without detracting from the scenic effect of the waterfall, and the invention consists in rebuilding the face of the precipice or building a dam thereon of reinforced concrete or masonry, providing in the face of the dam chambers to receive power converting machinery, providing penstocks leading from the face of the precipice or dam below the crest, to the power converting machinery and providing means for regulating the amount of water that can enter the penstocks.

The important spectacular features of a waterfall result principally from the action of light on the volume of water as it passes over the crest of the precipice and from the spray and mist that rises from the base of the fall. After passing over the crest of the precipice or dam, the water in its fall is broken up by contact with the air and is rendered practically opaque. This condition of the falling water I take advantage of and divert a large portion of the water soon after it has passed over the crest, utilize the dynamic energy contained in said diverted water and return it to the stream at the base of the fall causing it to augment the spray and mist and thus greatly increase the beauty of the fall. In order to render it impossible for the deflection of the maximum amount of water from below the crest of the fall to impair the scenic effect of the face of the fall, the face of the dam or precipice behind the fall may be provided with an appropriately colored surface.

Figure 1:
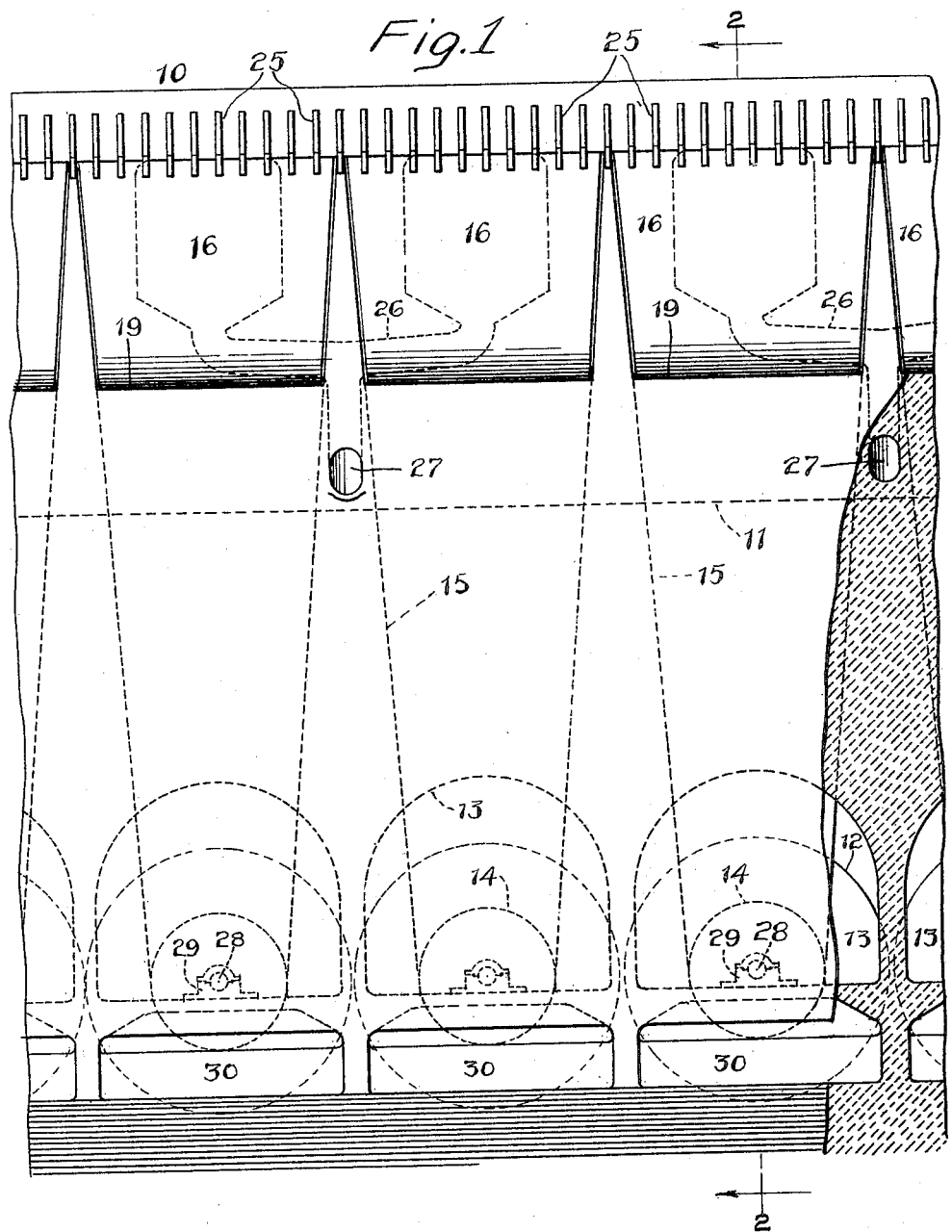
Figure 2:
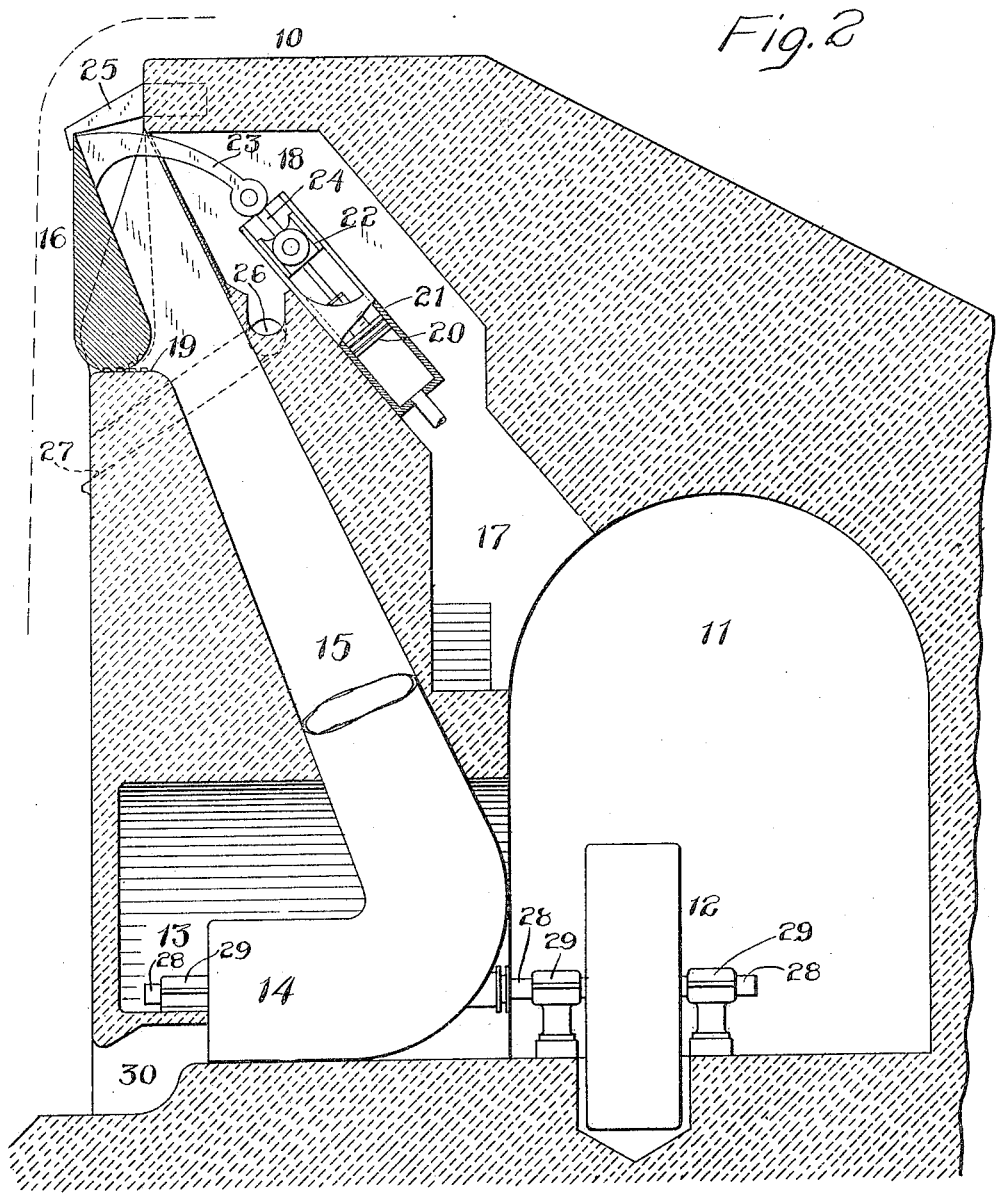

In the accompanying drawings forming a part of this specification, Figure 1 is a face view of the rebuilt precipice or dam, and Fig. 2 is a section on the line 2—2 in Fig. 1, looking in the direction of the arrows.

10 denotes the dam or rebuilt precipice, 11 a chamber extending longitudinally of the dam in which I place generators 12, 13 chambers opening into chamber 11 and adapted to receive water wheels 14, 15 penstocks leading from the face of the dam below the crest to chambers 13, 16 gates which are adapted to close the penstocks or to regulate the volume of water that can enter them, 17 chambers leading from chamber 11 and extending to the upper ends of the penstocks and 18 operating mechanism in said chambers for controlling the gates.

It is wholly immaterial so far as the present invention is concerned what types of generators or water wheels are used. As shown in the drawings, each water wheel and the corresponding generator are mounted on a shaft 28 journaled in bearings 29 in chambers 11 and 13. A passage 30 leads outward and downward from each water wheel casing and opens in the face of the dam at the base, for returning to the stream all water taken therefrom, thereby adding greatly to the disturbance of the water and increasing the spray and mist at the base of the fall. In order to enable me to take water from the entire face of the fall and to conduct the water thus taken to independent water wheels, I make the lower ends of the penstocks circular in cross section, flatten the ascending sides and cause the sides corresponding with the face and back of the dam to converge and the sides at right angles thereto, that is, the sides of the penstocks contiguous to each other, to diverge or incline outward, so that they will intersect at their upper ends and a continuous sheet of water will pass into the penstocks, as will be readily understood by comparing the figures of the drawings.

The gates, which correspond in front elevation with the upper ends of the penstocks, may be constructed and operated in any ordinary or preferred manner. I have shown solid gates having rounded bases provided with gear teeth which engage corresponding teeth upon ledges 19 in the face of the dam. From the bases, the faces of the gates incline toward each other and converge at their upper ends which act as cut waters and divide the volume of water passing over the crest, diverting a predetermined amount thereof into the penstocks. I have shown the gates as operated by means of pistons 20 which are caused to reciprocate in any ordinary or preferred manner in cylinders 21. Each piston is connected to a block 22 which also reciprocates in the cylinder. Each gate is provided with an inwardly extending arm 23 which passes through an opening in the corresponding penstock, and links 24, pivoted to the blocks and the arms respectively, cause the gates to be swung inward or outward when the pistons are reciprocated.

25 denotes guards which are rigidly secured in the face of the dam at the crest and act to prevent large articles, as cakes of ice and pieces of wood, from passing into the penstocks. The outer ends of the guards are preferably shaped to form stops for the upper ends of the gates when swung to the fully open position, as shown in the drawings.

26 denotes troughs in chambers 17, and 27 ducts leading from said troughs to the face of the dam, which are provided to drain off any water that may chance to leak through the openings in the penstocks through which arms 23 pass.

The operation will be obvious from the drawings. No water is taken until it has passed over and below the crest of the dam. The amount of water that can pass into the individual penstocks is determined by the adjustment of the gates, and all the water that does pass into the penstocks is returned to the stream at the base of the fall and increases the amount of spray and mist rising therefrom.

Having thus described my invention I claim:

1. A structure of the character described comprising a dam having a chamber, a water wheel in said chamber, a passage leading from the water wheel to the face of the dam, a penstock leading from the face of the dam below the crest to the water wheel, a swinging gate in front of the penstock, an arm extending therefrom and means operating through said arm to swing the gate and regulate the volume of water that can enter the penstock.

2. A structure of the character described comprising a dam having a chamber, a water wheel in said chamber, a passage leading from the water wheel to the face of the dam, a penstock leading from the face of the dam to the water wheel, a ledge having gear teeth, a gate having a rounded head provided with corresponding gear teeth and converging faces forming a cutwater, and means for swinging the gate, substantially as described, for the purpose specified.

3. A structure of the character described comprising a dam having a chamber, a water wheel in said chamber, a passage leading from the water wheel to the face of the dam and a penstock leading from the face of the dam to the water wheel, the lower end of said penstock being circular in cross section, the front and back converging and the sides diverging, substantially as described, for the purpose specified.

4. A structure of the character described comprising a dam having a chamber, a water wheel in said chamber, a passage leading from the water wheel to the face of the dam, a penstock leading from the face of the dam to the water wheel, the lower end of said penstock being circular in cross section, the front and back converging and the sides diverging, and a swinging gate corresponding in elevation with the upper end of the penstock.

5. A structure of the character described comprising a dam having a chamber, a water wheel in said chamber, a passage leading from the water wheel to the face of the dam, a penstock leading from the face of the dam to the water wheel, a swinging gate for controlling the volume of water to the penstock and guards secured in the face of the dam at the crest and forming stops to limit the outward movement of the gate.

6. A structure of the character described comprising a dam having a chamber, a water wheel in said chamber, a passage leading from the water wheel to the face of the dam, a penstock leading from the face of the dam below the crest to the water wheel, a swinging gate for controlling the flow of water to the penstock and guards which prevent articles from entering the penstock and limit the opening movement of the gate.

7. A structure of the character described comprising a dam having a chamber, a water wheel in said chamber, a passage leading from the water wheel to the face of the dam, a penstock leading from the face of the dam below the crest to the water wheel, a ledge, a swinging gate having a base resting on the ledge, and converging faces, for the purpose set forth, and means for operating the gate to control the flow of water to the penstock.

In testimony whereof I affix my signature in presence of two witnesses.

WILLIAM H. BAKER.

Witnesses:
J. PEARCE AUETSTO,
W. D. CAIRNS.